United States Patent [19]

Illy et al.

[11] Patent Number: 6,109,168
[45] Date of Patent: Aug. 29, 2000

[54] ESPRESSO COFFEE MACHINE

[75] Inventors: Andrea Illy; Luca Mastropasqua, both of Trieste, Italy

[73] Assignee: Illycaffe S.p.A., Trieste, Italy

[21] Appl. No.: 09/297,523

[22] PCT Filed: Oct. 16, 1997

[86] PCT No.: PCT/EP97/05722

§ 371 Date: Jun. 16, 1999

§ 102(e) Date: Jun. 16, 1999

[87] PCT Pub. No.: WO98/19584

PCT Pub. Date: May 14, 1998

[30] Foreign Application Priority Data

Oct. 16, 1997 [IT] Italy .............................. MI96A002294

[51] Int. Cl.$^7$ .............................. A47J 31/44; A47J 31/06
[52] U.S. Cl. .................. 99/285; 99/323; 99/279
[58] Field of Search .............................. 99/285, 342, 343, 99/279, 323, 323.3, 302 R; 374/141, 180, 179

[56] References Cited

U.S. PATENT DOCUMENTS

| 4,951,556 | 8/1990 | Ng .............................................. 99/285 |
| 5,441,344 | 8/1995 | Cook, III .............................. 99/342 X |
| 5,447,248 | 9/1995 | Rodriquez et al. ...................... 215/366 |

FOREIGN PATENT DOCUMENTS

| 3904859 | 8/1990 | Germany . |
| 9203171 | 6/1992 | Germany . |
| 4343919 | 6/1995 | Germany . |
| 8164074 | 6/1996 | Japan . |

*Primary Examiner*—Reginald L. Alexander
*Attorney, Agent, or Firm*—Keil & Weinkauf

[57] ABSTRACT

A temperature sensor is associated with a dose-holder in the coffee machine and is adapted to detect the thermal status thereof. The temperature sensor is connected to a measurement device that measures the temperature sensed and a signaling device for signaling the measured temperature positioned to be visible for the user.

15 Claims, 3 Drawing Sheets

ESPRESSO COFFEE MACHINE

BACKGROUND OF THE INVENTION

1. Field of the Invention

The present invention concerns improvements to an espresso coffee machine, more especially, an espresso coffee machine fitted with a controlled temperature dose-holder.

In the present description the dose-holder is intended as that part of an espresso coffee machine suited to containing a prepackaged dose of coffee or else a dose of loose coffee from which a coffee beverage may be brewed.

One should, first of all, recall that according to the prior art, a dose-holder of an espresso coffee machine also comprises a peripheral structure, conventionally called <<cup>>, in which there is an internal structure that carries the dose of coffee, that is conventionally called <<filter>>, when it must hold a dose in the form of loose coffee, or in that of a disk in which the coffee is held between two filter-paper elements, or else is conventionally called <<lodging>> when it must hold a dose in the form of <<cartridge>> or <<capsule>>, and hence, that the coffee beverage brewed by percolation, that is by the passage of hot water under pressure through the dose of coffee, comes into contact with the internal surface of the cup before falling into the coffee-cup, and for this reason, there is a thermal relationship between the temperature of the beverage just brewed from the dose of coffee and the temperature of the cup such as to affect the quality of the beverage.

Now, it is well known that in order to prepare a good espresso coffee it is at least necessary, on one hand, that the coffee be of good quality, properly roasted, ground, dosed, packaged and pressed, and, on the other hand, that the machine features proper technical characteristics in terms of geometry, construction, hydraulic sealing, etc., and that it must be controlled so as to provide the right pressure and temperature; another condition is that the active parts of the machine (boiler and heat-exchanger, percolation head and dose-holder) are kept at the correct temperature and this sets a problem for the dose-holder that is passively heated by heat transferred from the percolation head of the machine, and, essentially, it is the most peripheral active part of the machine and gets heated later.

Espresso coffee machines according to the state of the art, are, upon being switched on, unable to ensure the thermal conditions suited to obtaining a good coffee unless one applies the method of bringing the machine to standard by a preliminary empty-run, that is allowing hot water or vapour to run through the dose holder bringing it to a temperature close to that of the hot water that runs through it during the brewing of coffee. Consequently the first cup, or cups, of coffee brewed after a period of inactivity of the machine do not provide satisfactory results, in fact, a temperature of the dose-holder conveniently close to that of the percolated coffee is the one that better enhances the formation, on the surface of the coffee, of the emulsion phase that is typical of espresso coffee that is called <<cream>>, and of which the quantity, creaminess and durability are especially appreciated by consumers.

Please note that known coffee machines are equipped only to indicate the temperature of the hot water generator, among the active parts, and not others, such as, the dose-holder.

2. Description of Related Art

Documents DE-U-9203171 and Patent Abstract of Japan, vol. 96 n° 10, 31, 10, 96, JP-A-08 164074 are known that disclose, respectively, a container for preparing coffee or tea of the "thermos" type and a percolator pot for extracting drinkable material both provided with temperature sensor(s) able to indicate the temperature of the beverage once the latter is into the container or pot; the scope of said contrivances is the one of allowing a user to know the temperature of the brewed beverage, whilst the scope of this present invention is to let a user wait for the dose-holder reaching a desired temperature after the machine is switched on and before starting a brewing operation.

BRIEF SUMMARY OF THE INVENTION

The present invention obviates the drawbacks and limits referred to above and, as characterized in the claims herein, concerns improvements to an espresso coffee machine, of the manual or automatic type, in which a temperature sensor is associated to the dose-holder in order to sense its temperature and make it known to a user thanks to means that measure the temperature sensed and to means that indicate the temperature measured positioned on the outer part of the machine.

This same sensor is connected to measurement means of the sensed temperature, in turn connected to indicator means of the temperature of the dose-holder, all, or a part, of these means being located so as to be visible by a user, in a convenient part of the machine and also outside the same machine.

The measurement and indicator means may be of the continuous type or of the threshold type; in the first case they measure and indicate the temperature gradually reached by the dose-holder or the coffee that flows through it, and in the second case they indicate that at a certain moment the dose-holder or the coffee that flows through it has reached the desired temperature, especially, that temperature that is suited to the formation of cream on the surface of the espresso.

The main advantage of the present invention is provided by the possibility for the user to activate the brewing of the espresso coffee machine after having ascertained that the temperature of the dose-holder is at least suited to obtaining a satisfactory cream on the surface of the coffee in the coffee-cup, and this will mean that all the other desired thermal conditions will have been reached.

The temperature sensor comprises a thermometer probe or sensor and is associated with an indicator suited to the type of probe or sensor.

The temperature sensor may function according to various physics principles that are currently developed also from the technical applications viewpoint. Purely as an example, follows a list of families of temperature sensors and related associated parts that may be employed in the machine complying with the present invention:

- the electric thermometer family, such as thermo-couples, variable electric resistances with their amplifiers, analogue or digital indicators, and the possibility of adding threshold luminous or sound signals to such thermometers;
- the bulb thermometer family, based on the principle of fluid expansion or the vapour tension with temperature, with their capillaries and indicators, generally analogue with a dial divided into coloured areas according to the temperature to be indicated; this family features the advantage of not requiring a power source;
- the on-off thermostat family, that usually close or open an electric circuit associated to their indicator showing, the status reached, generally either a visual or sound indicator that signals immediately the temperature threshold reached;

the photo-thermal family of indicators made by substances that change colour, opacity, etc. with temperature.

the optical pyrometers family that measure the temperature of a body also at a distance on the basis of the infrared energy radiations.

In addition to the above listed temperature sensors, there are others that may be suited to being employed in the invention, that aren't quoted, because they are no doubt known by experts in the field.

BRIEF DESCRIPTION OF THE SEVERAL VIEWS OF THE DRAWINGS

The invention will be explained in detail below with examples of embodiment and with reference to the attached drawings, in which.

DETAILED DESCRIPTION OF THE INVENTION

Figure 1:
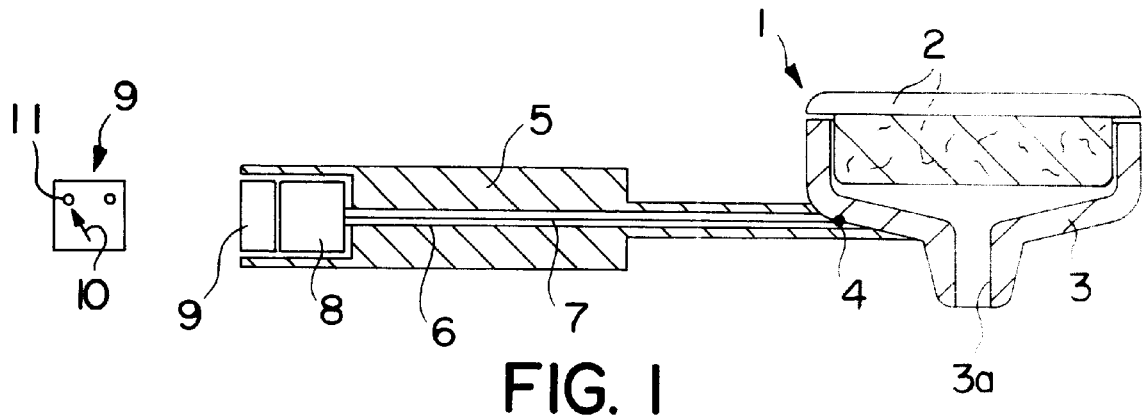
FIGS. 1, 2, 3 are perspective views of a dose-holder.

FIG. 1 shows a dose-holder 1 with its filter 2 for a dose of loose coffee within cup 3 that is a part of the dose-holder, cup that extends below through channel 3a through which the brewed coffee ends up in the coffee-cup, and a temperature sensor 4 set in contact with the external wall of the cup; within handle 5 there are structural and thermal elements such as to sense and indicate the temperature of the cup externally: a channel 6, an element 7 that connects sensor 4 to the measurement device 8, a display 9 associated to the measurement device and set on the end face of the handle, shown separately on the left of the drawing; the display carries the temperature indicator 10 and the threshold signal 11 suited to signalling that the dose-holder has reached the correct temperature. This solution is specially suited in order to know the exact temperature of the dose-holder before activating the brewing of the coffee. The dose-holder material is heated by conduction from the attachment with the machine's boiler; otherwise, the same user may cause hot water or vapour to flow through the dose-holder before activating the percolation.

Figure 2:
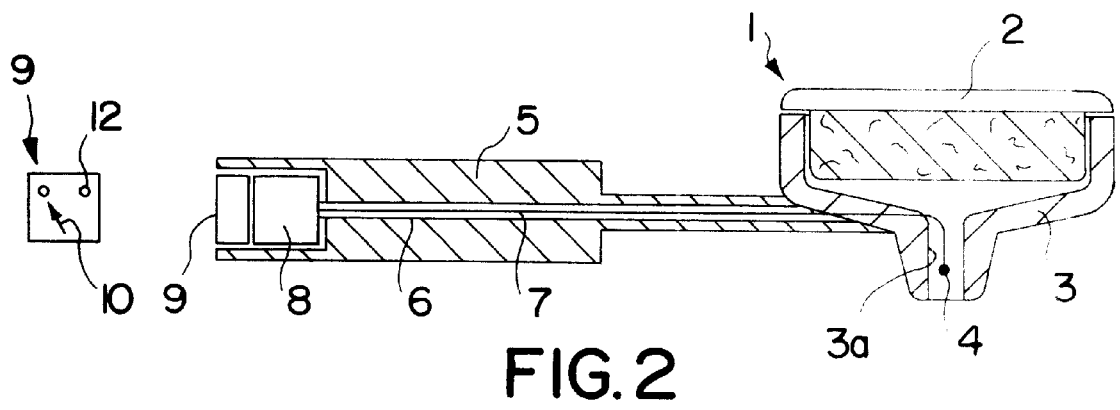

FIG. 2 shows the same dose-holder 1 with filter 2, cup 3 and handle 5, as in FIG. 1; moreover the figure shows a temperature sensor 4 set within the cup 3, under the filter and along channel 3a; by means of element 6, the sensor is connected to the measurement device 8 fitted with display 9; the latter carries the temperature indicator 10 and the threshold signal 12 that signals that the beverage is being produced at the correct temperature. This solution is especially suited to achieve a monitoring of the machine, that is, especially, to measure, and in any case, control the temperature of the beverage during the preparation of an espresso coffee.

Figure 3:
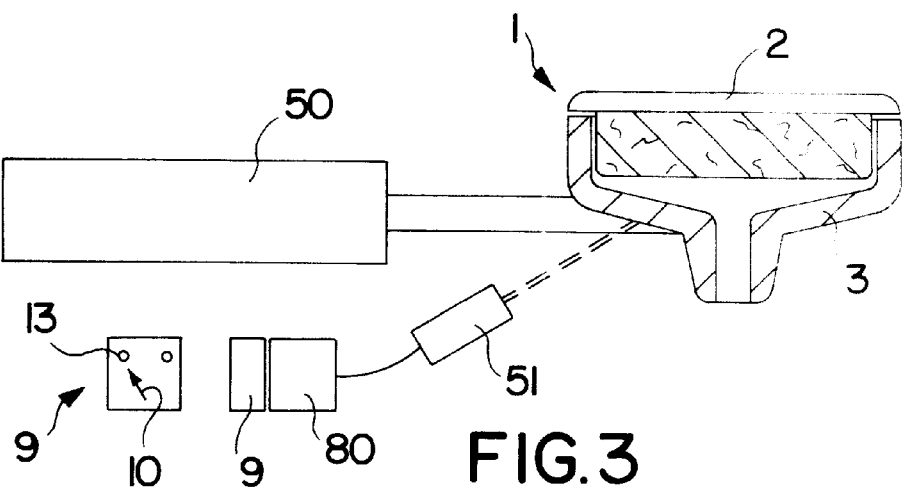

FIG. 3 again shows the same dose-holder 1 with filter 2 and cup 3 as in FIG. 1, and moreover shows that the dose-holder has a conventional handle 50 and is associated to a temperature sensor 51 sensitive to infrared radiation conveniently mounted on the casing of the espresso coffee machine (not shown) and aimed at the same dose-holder. The measurement device 80 fitted with a display 9 and the temperature sensor 51 are located appropriately, also separately from the machine, but where they are easily visible to an operator and where they can be electrically powered.

The display carries the temperature indicator 10 and the threshold signal 13 that signals that the dose-holder has reached the correct temperature. This solution is specially suited to foresee the correct temperature of the dose-holder before starting percolation: the dose-holder materials are heated either by heat conduction from the machine's boiler and through the fitting or because the user causes hot water or vapour to flow through the dose-holder. The practical realization of this solution is made easier by its being separate from any delicate devices that in some cases require independent electric energy sources.

Figure 4:
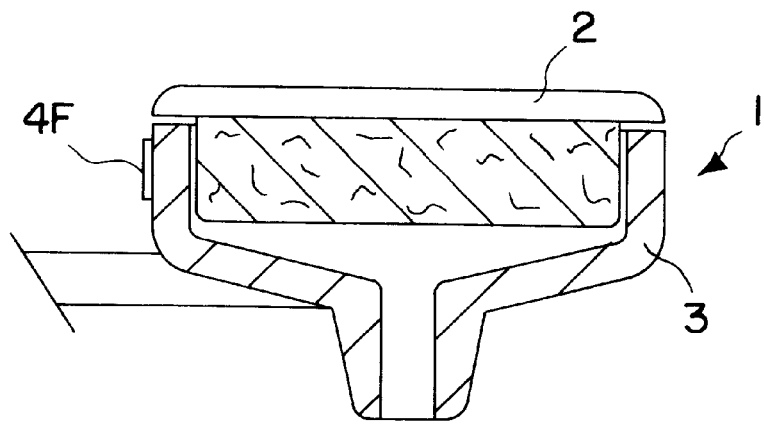
FIG. 4 is a first part view.

FIG. 4 shows how on the external wall of the cup 3 of a dose-holder 1, in an easily visible position for the operator, a photo-thermal heat sensor 4F is positioned, that changes colour each time the threshold temperature is reached, as correlated to the desired temperature for the dose-holder.

Figure 5:
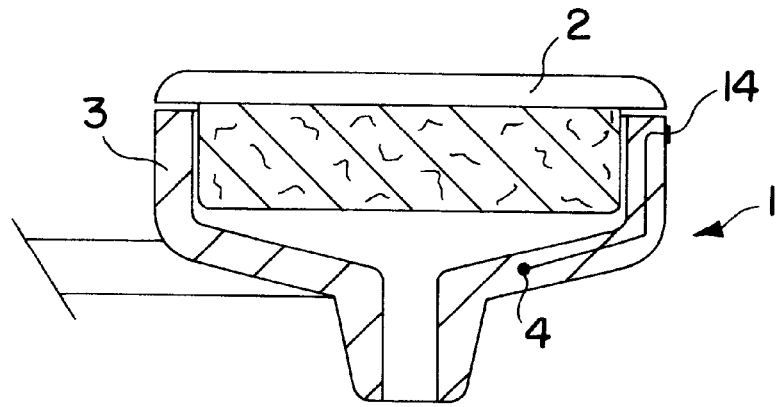
FIG. 5 is a second part view.

FIG. 5 shows how in the thickness of the cup wall 3 of a dose-holder 1 a temperature sensor 4 is incorporated that transfers its signal to a contact 14 fitted on the upper border of the filter-carrier that, in turn, connects by means of another suitable means to a temperature sensor and a display, connector means that is conveniently located in the fixed part of the machine and is not shown herein. This solution offers the advantage of a more rapid thermal and reliable response compared to other solutions and is preferable when the size of the temperature sensor is such as to be contained in a hollow in the wall of the cup.

Figure 6:
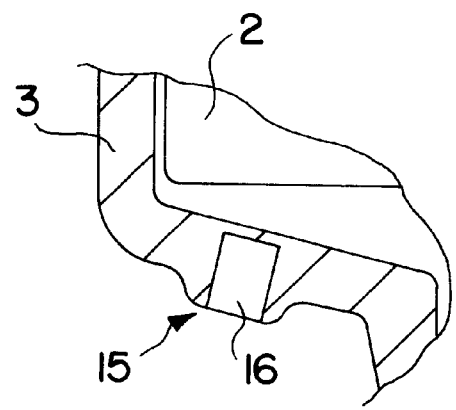
FIG. 6 is a part cross-section.

FIG. 6 shows how in the wall of a cup 3 of a dose-holder 1, wall that is generally rather thin, an external extension 15 is formed suited to containing a chamber 16 in turn suited to holding the bulb of a thermometer connected to the measurement equipment and the other devices, similarly to the descriptions of the previous figures. The purpose of extension 15 is that of conveniently containing, from a mechanical and thermal viewpoint, the thermometer bulb bearing an adequate quantity of fluid.

Figure 7:
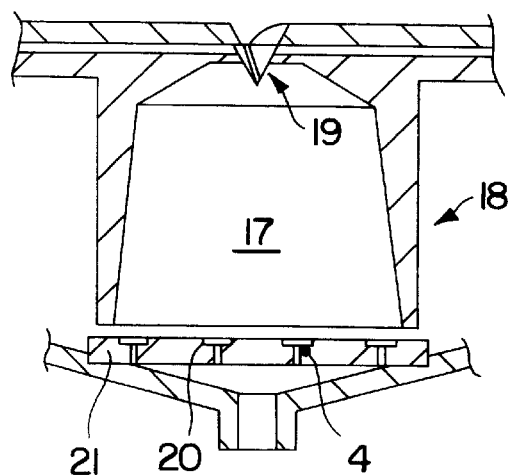
FIG. 7 is a first cross-section.

FIG. 7 shows a percolation chamber 17 in which the dose-holder 18 is suited to receiving a dose of coffee sensibly in the shape of a frustum capsule with a perfectly sealed package; the capsule, not shown in the drawing, once lodged in the dose-holder, is perforated in its upper wall by a perforating element 19 and on its lower wall by a number of reliefs 20 solid with the bottom wall or plate 21; incorporated within the latter is a temperature sensor 4 that may be connected to a measurement apparatus 8 (not shown) in one of the ways described, for example, with reference to FIGS. 1 and 5, the plate being considered the most effective in indicating the temperature reached by the dose-holder.

Figure 8:
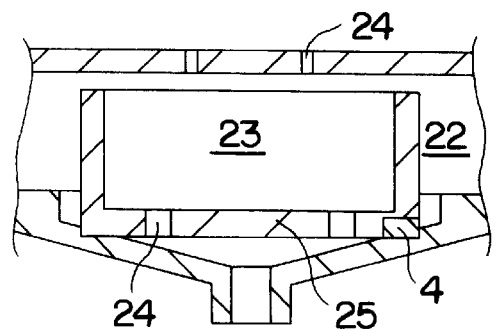
FIG. 8 is a second cross-section.

FIG. 8 shows a percolation chamber 22 in which the dose-holder 23 is suited to receiving a dose of coffee in the shape of a cylindrical cartridge (not shown in the drawing) in a perfectly sealed package bearing a plurality of holes 24 on each of the opposite circular walls interested by the passage of the percolation water, in the bottom wall 25 of the dose-holder a temperature sensor 4 is incorporated that is also connected to the measurement apparatus 8 in one of the appropriate ways described above.

Figure 9:
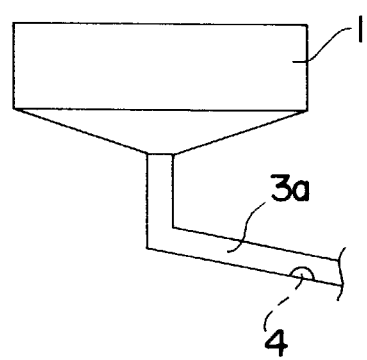
FIG. 9 is a third cross-section.

FIG. 9 shows the dose-holder 1 of an automatic espresso machine in which the channel 3a is considerably extended and includes within its body and towards the outside a temperature sensor 4; in automatic machines the dose-holder may be automatically pre-heated by means of the flow of hot water or vapour or by direct electrical heating in order to heat and control also any chosen point in channel 3a by means of a temperature sensor; please note that in automatic machines the dose-holder is moved mechanically and is therefore without a handle.

In general, the temperature sensor must be suited to measuring temperatures being between room temperature and the highest operating temperature of the machine (roughly 100–110° C.).

The embodiments described may be completed by output connectors or interfaces suited to connecting the dose-holder thermometer devices to external instruments both to enable locating these outside the dose-holder (e.g. on the borders of the espresso machine) and to extend the application to complex systems for measuring various parameters.

What is claimed is:

1. An espresso coffee machine comprising
   a dose-holder (1),
   a temperature sensor (4) associated to the dose-holder (1) to sense the temperature of the dose-holder after the machine is turned on and before starting coffee brewing,
   a measurement device (8) connected to the temperature sensor (4) to measure the temperature sensed by the temperature sensor (4), and
   a display (9) on the outside of the machine associated to the measurement device (8) to indicate the temperature or that a desired temperature has been reached.

2. The espresso coffee machine of claim 1, wherein the temperature sensor (4) is in contact with the wall of the cup (3) of the dose-holder (1).

3. The espresso coffee machine of claim 1, wherein the temperature sensor (4) is incorporated in the thickness of the cup (3).

4. The espresso coffee machine of claim 2, wherein the wall of the cup (3) includes an extension (15) bearing a chamber (16).

5. The espresso coffee machine of claim 1, wherein the temperature sensor (4) is in contact with a dose-holder channel (3a) through which the brewed coffee falls into the coffee-cup.

6. The espresso coffee machine of claim 1, wherein the temperature sensor (4) is positioned so as to come into contact with the brewed coffee in a given point of a dose-holder channel (3a) through which the brewed coffee falls into the coffee-cup.

7. The espresso coffee machine of claim 1, wherein the temperature sensor (4) is associated to the bottom wall (21, 25) of a dose-holder (17, 23) suited to receiving a dose of coffee in the shape of a capsule.

8. The espresso coffee machine of claim 1, wherein said measuring device (8) and the signaling device (9, 10, 11) are contained in a handle (5) of the dose-holder.

9. The espresso coffee machine of claim 1, wherein the temperature sensor (51) is sensitive to the infrared radiation emitted by the cup (3), is set at a distance from the dose-holder (1) and aimed at the cup (3).

10. The espresso coffee machine of claim 1, wherein the temperature sensor is a photo-thermal heat sensor (4F) that changes color every time that the cup (3) has reached a threshold temperature correlated with the temperature desired for the dose-holder (1).

11. The espresso coffee machine of claim 4, wherein the temperature sensor (4) is incorporated in the thickness of the cup (3).

12. The espresso coffee machine of claim 1, further comprising a percolation head which passively heats the dose-holder by heat transfer when the machine is turned on.

13. The espresso coffee machine of claim 1, wherein the temperature sensor is suited to measuring temperatures over a range at least from room temperature to approximately 110° C.

14. The espresso coffee machine of claim 1, wherein the display (9) indicates the temperature.

15. A process for preparing coffee with the espresso coffee machine of claim 1, said process comprising the following steps which take place after turning the machine on and before starting coffee brewing,
    heating the dose-holder (1),
    sensing the temperature of the dose-holder with the temperature-sensor (4),
    measuring the temperature sensed by the temperature sensor with the measurement device (8), and
    displaying the temperature or that a desired temperature has been reached, as measured by the measurement device (8), on the dispay (9) on the outside of the machine.

* * * * *